UNITED STATES PATENT OFFICE.

WALLACE S. CHASE, OF LAKEWOOD, OHIO, ASSIGNOR, BY MESNE ASSIGNMENTS, TO NATIONAL CARBON COMPANY, INC., A CORPORATION OF NEW YORK.

PROCESS OF OBTAINING COMPOUNDS OF CERIUM-GROUP METALS FROM MONAZITE SANDS.

1,279,257.     Specification of Letters Patent.     Patented Sept. 17, 1918.

No Drawing.     Application filed November 20, 1916. Serial No. 132,274.

*To all whom it may concern:*

Be it known that I, WALLACE S. CHASE, a subject of the King of Great Britain, residing at Lakewood, in the county of Cuyahoga and State of Ohio, have invented a certain new and useful Improvement in Processes of Obtaining Compounds of Cerium-Group Metals from Monazite Sands, of which the following is a full, clear, and exact description.

This invention relates to a process of treating monazite sands to obtain the cerium group compounds substantially free from other rare-earth constituents.

Monazite sands consist essentially of the phosphates of the cerium group metals, and usually contain varying quantities of compounds of thorium and yttrium group metals. Thorium finds its chief use in the incandescent mantle industry, while cerium and yttrium compounds are employed as constituents of flaming arc electrodes. There are other uses for these metals either as free metals or as compounds, but it is not necessary to enumerate them in this specification.

Since I primarily desire to obtain the cerium group compounds, I prefer, from the expense standpoint to utilize sands that are low in thorium, such sands being cheap since they are unsuitable for use in the incandescent mantle industry. However, the process is not to be restricted to any particular raw material as it is applicable to all rare-earth minerals.

The monazite sands after proper concentration are ground to pass through a 200 mesh screen, after which they are decomposed by heating with concentrated sulfuric acid. When decomposition is substantially complete the pasty mass is lixiviated and filtered to remove the insoluble residue.

The solution contains all the rare-earth metals as sulfates, much orthophosphoric acid ($H_3PO_4$) and considerable sulfuric acid.

In order to separate the rare-earths from this solution free from phosphoric acid it is necessary that the precipitation take place in the acid solution. Heretofore oxalic acid has been used as the precipitant, but its cost is too great and the process involves several steps if the cerium is to be separated from the thorium and yttrium compounds.

I have found that sodium acid sulfate ($NaHSO_4$) can be used directly to precipitate the cerium group from the sulfuric acid solution referred to above. When this is added the cerium group comes down practically free from the thorium and the yttrium group and the other constituents which remain in solution. After filtering and washing the desired separation is complete.

The precipitate obtained by the concentration of alkali sulfate specified later will be found to consist of the double sulfates of sodium and the metals of the cerium group, and has the composition for cerium of $Ce_2(SO_4)_3 \cdot Na_2SO_4 \cdot 2H_2O$. The composition of course will vary somewhat with the concentration of the alkaline sulfate solution, the temperature, etc. I have found that precipitation in a warm solution favorably affects the character of the precipitate.

While I prefer to use sodium acid sulfate, the normal sulfate may be utilized. However, when the acid sulfate is used the precipitate comes down more quickly, settles more readily and has better physical properties. Also potassium acid sulfate or normal potassium sulfate may be used if the separation of thorium from the cerium is not desired.

There is no definite proportion of sodium acid sulfate that is absolutely essential, and I have gotten good results when the solution after precipitation of the double sulfates contains about 60 g. $NaHSO_4$ and 12 cc. free sulfuric acid in 300 cc. of solution. This of course may be varied if desired. I also have gotten good results with no free sulfuric acid, but in such case the precipitation is less complete.

Apart from its low cost the process has the advantages that the double sulfate precipitate decreases, whereas the oxalate increases in solubility as the sulfuric acid concentration increases. In the improved process, therefore it is not necessary to evaporate the excess sulfuric acid from the extraction to a certain quantity as is necessary in the oxalate process, the presence of such excess being decidedly advantageous. Also in my process the cerium group is obtained in one operation, instead of in a plurality of steps as is the case in the oxalate process.

The improved process can be used not only to obtain the cerium group, but as a step in the process of obtaining thorium or the yttrium group by known methods. Phosphoric acid is also a by-product of the process which adds to its value.

While the process is primarily devoted to the separation of the cerium group from the other rare-earth compounds and phosphoric acid, nevertheless the double sulfates resulting from the process would be further treated to obtain cerium group oxids, fluorids, etc. To obtain the oxid the double sulfates would be fused with sodium carbonate, the sodium sulfate being readily separated from the oxids by dissolving in water.

The cerium group oxids may be converted into the fluorids by the process claimed in my application filed Jan. 31, 1916, Serial No. 75,249.

Having described my invention what I claim is:—

1. The process of obtaining compounds of cerium group metals which consists in decomposing minerals containing metals of the cerium group with sulfuric acid and adding a sulfate of sodium to precipitate double sulfates of sodium and metals of the cerium group.

2. The process of obtaining compounds of the cerium group metals which consists in decomposing monazite sands with sulfuric acid and adding sodium acid sulfate to precipitate a double sulfate of sodium and the metals of the cerium group.

In testimony whereof, I hereunto affix my signature.

WALLACE S. CHASE.